United States Patent
Goto et al.

(10) Patent No.: US 10,128,940 B2
(45) Date of Patent: Nov. 13, 2018

(54) OPTICAL TRANSMISSION METHOD AND OPTICAL TRANSMISSION SYSTEM

(71) Applicant: MITSUBISHI ELECTRIC CORPORATION, Chiyoda-ku (JP)

(72) Inventors: Hiroki Goto, Chiyoda-ku (JP);
Tsuyoshi Yoshida, Chiyoda-ku (JP);
Kiyoshi Onohara, Chiyoda-ku (JP);
Takashi Sugihara, Chiyoda-ku (JP);
Kazuo Kubo, Chiyoda-ku (JP);
Tatsuya Kobayashi, Chiyoda-ku (JP);
Keisuke Matsuda, Chiyoda-ku (JP);
Masashi Binkai, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/302,382

(22) PCT Filed: Apr. 16, 2015

(86) PCT No.: PCT/JP2015/061669
§ 371 (c)(1),
(2) Date: Oct. 6, 2016

(87) PCT Pub. No.: WO2015/170558
PCT Pub. Date: Nov. 12, 2015

(65) Prior Publication Data
US 2017/0041067 A1 Feb. 9, 2017

(30) Foreign Application Priority Data

May 8, 2014 (JP) .................................. 2014-096776

(51) Int. Cl.
*H04B 10/079* (2013.01)
*H04B 10/075* (2013.01)
(Continued)

(52) U.S. Cl.
CPC ..... *H04B 10/07953* (2013.01); *H04B 10/075* (2013.01); *H04B 10/2543* (2013.01);
(Continued)

(58) Field of Classification Search
None
See application file for complete search history.

(56) References Cited

U.S. PATENT DOCUMENTS 5,841,557 A 11/1998 Otsuka et al.
6,091,864 A * 7/2000 Hofmeister ........... G02F 1/3136
359/254
(Continued)

FOREIGN PATENT DOCUMENTS

EP 1 100 217 B1 3/2007
JP 2001-136125 A 5/2001
(Continued)

OTHER PUBLICATIONS

J. Berthold, et al., "100 G Ultra Long Haul DWDM Framework Document," Optical Internetworking Forum, Jun. 2009, 10 pages.
(Continued)

*Primary Examiner* — Ken N Vanderpuye
*Assistant Examiner* — David Lambert
(74) *Attorney, Agent, or Firm* — Oblon, McClelland, Maier & Neustadt, L.L.P.

(57) ABSTRACT

An optical transmission method wavelength-multiplexing and transmitting multiple channels including data. The data are composed of data areas independent between the channels and data areas non-independent between the channels. Data patterns of the data areas non-independent between the channels are variable. The data patterns of the data areas non-independent between the channels are set so that in time periods of the non-independent data areas on an optical transmission section, a time period during which polariza- (Continued)

tion states of the multiple channels are correlated in the optical transmission section has a length such that an error rate is less than or equal to a threshold value, the error rate being determined from a temporal distribution of bit errors obtained from a result of error decision after demodulation in an optical receiver.

18 Claims, 15 Drawing Sheets

(51) Int. Cl.
    *H04B 10/2543*     (2013.01)
    *H04B 10/50*     (2013.01)
    *H04J 14/02*     (2006.01)
    *H04J 14/06*     (2006.01)

(52) U.S. Cl.
    CPC .......... *H04B 10/50* (2013.01); *H04J 14/0227* (2013.01); *H04J 14/06* (2013.01)

(56) References Cited

U.S. PATENT DOCUMENTS

| | | | |
|---|---|---|---|
| 8,909,066 B2 | 12/2014 | Yoshida et al. | |
| 8,934,782 B2 | 1/2015 | Nakagawa et al. | |
| 2002/0141408 A1 | 10/2002 | Chang et al. | |
| 2009/0196602 A1* | 8/2009 | Saunders | H04B 10/5053 398/26 |
| 2011/0185262 A1* | 7/2011 | Kershaw | H04B 7/0619 714/776 |
| 2013/0170787 A1* | 7/2013 | Nagarajan | H04B 10/506 385/14 |
| 2013/0259478 A1* | 10/2013 | Komaki | H04B 10/516 398/58 |
| 2016/0006512 A1 | 1/2016 | Konishi et al. | |
| 2016/0087786 A1 | 3/2016 | Onohara | |

FOREIGN PATENT DOCUMENTS

| | | |
|---|---|---|
| JP | 2011-101106 A | 5/2011 |
| JP | 2012-108301 A | 6/2012 |
| JP | 5372180 B2 | 12/2013 |
| JP | 2014-220709 A | 11/2014 |
| JP | 2015-8356 A | 1/2015 |
| WO | 2011/096488 A1 | 8/2011 |
| WO | 2012/073590 A1 | 6/2012 |
| WO | 2014/129539 A1 | 8/2014 |
| WO | 2014/155515 A1 | 10/2014 |

OTHER PUBLICATIONS

E. Yamazaki, et al., "Fast optical channel recovery in field demonstration of 100-Gbit/s Ethernet over OTN using real-time DSP," Optics Express, vol. 19, No. 14, Jul. 4, 2011, pp. 13179-13184.

X. Li, et al., "Electronic post-compensation of WDM transmission impairments using coherent detection and digital signal processing," Optics Express, vol. 16, No. 2, Jan. 21, 2008, pp. 880-888.

D.D. Marcenac, et al., "40 Gbit/s transmission over 406km of NDSF using mid-span spectral inversion by four-wave-mixing in a 2mm long semiconductor optical amplifier," Electronics Letters, vol. 33, No. 10, May 8, 1997, pp. 879-880.

International Search Report dated Jun. 30, 2015 in PCT/JP2015/061669 Filed Apr. 16, 2015.

Extended European Search Report dated Sep. 5, 2017 in European Patent Application No. 15789979.0.

Combined Chinese Office Action and Search Report dated Apr. 28, 2018 in Chinese Patent Application No. 201580024080.7 (with English language translation and English translation of categories of cited documents).

* cited by examiner

▓ FIXED PATTERN

▓ AREA IN WHICH SIGNAL QUALITY IS AFFECTED BY NON-LINEAR OPTICAL EFFECTS DEPENDING ON OTHER CHANNELS CURRENTLY TRANSMITTED

OTUk FRAME FORMAT

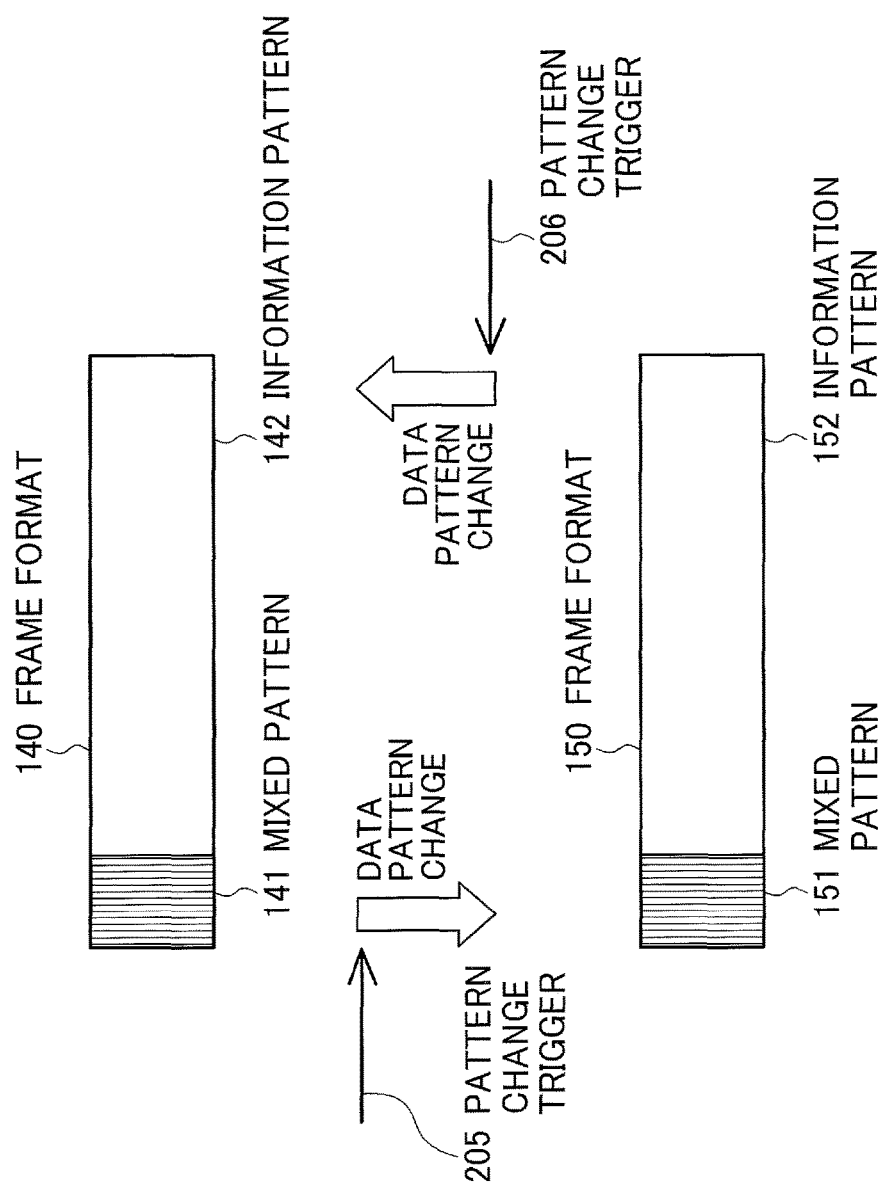

OPTICAL TRANSMISSION METHOD AND OPTICAL TRANSMISSION SYSTEM

TECHNICAL FIELD

The present invention relates to an optical transmission method and an optical transmission system.

BACKGROUND ART

For long-distance and large-capacity transmission through optical fiber, high-density signal multiplexing needs to be achieved and fiber non-linear optical effects need to be overcome.

Transmission capacity per optical fiber can be increased by performing high-density wavelength multiplexing in which different information items are placed on multiple optical carriers or optical subcarriers (subcarriers). Here, each of the multiplexed optical carriers or optical subcarriers will be referred to as a channel. The transmission capacity can also be increased by using multilevel modulation.

On off keying (OOK) that transmits one bit per symbol by assigning binary signals to the presence or absence of light has been conventionally used as a modulation method. The transmission capacity can be increased by increasing signal points to increase the number of bits transmitted per symbol like quaternary phase-shift keying (QPSK) or 16 quadrature amplitude modulation (QAM). In QPSK and 16 QAM, an optical transmitter assigns signals to an in-phase axis (I-axis) and a quadrature-phase axis (Q-axis).

A method of using polarization multiplexing to double the number of bits transmitted per symbol is also known. In polarization multiplexing, signals can be independently assigned to two orthogonal polarization components (vertically polarized wave and horizontally polarized wave).

In demodulation of an OOK signal, direct detection in which the presence or absence of an optical signal is detected and identified on a receiving side has been used. In demodulation of a differential binary phase-shift keying (DBPSK) signal, a differential QPSK (DQPSK) signal, and the like, (direct) delay detection that causes an optical signal to be delayed and interfere and then performs direct detection has been used. A digital coherent method has been often used for polarization-multiplexed signals (see, for example, Non Patent Literatures 1 and 2); the digital coherent method performs coherent detection at a receiving end to obtain an electrical signal and compensates the obtained electrical signal by digital signal processing; the coherent detection performs detection by causing a local oscillation light source and a received signal to be mixed and interfere with each other.

On the other hand, in long-distance optical transmission, depending on the bit rate, modulation method, and detection method, a predetermined optical signal power to noise power ratio is required to ensure signal quality at a receiving end, and thus a signal needs to be transmitted at a high optical power. In this case, waveform distortion due to non-linear optical effects occurring in optical fiber deteriorates signal quality (see, for example, Patent Literature 1).

The non-linear optical effects can be roughly separated into effects occurring in a channel and effects occurring between channels.

The non-linear optical effects occurring in a channel include self-phase modulation (SPM). As narrower definitions, the SPM is divided into intra-channel self-phase modulation (ISPM), intra-channel cross-phase modulation (IXPM), intra-channel four-wave mixing (IFWM), and the like.

The non-linear optical effects occurring between channels include cross-phase modulation (XPM), four-wave mixing (FWM), cross polarization modulation (XPolM), and the like.

Each of them significantly occurs when the optical power density of a signal is high and when the transmission distance is long. For the non-linear optical effects occurring between channels, the quality deteriorates significantly when the local wavelength dispersion in a transmission line is small, when a wavelength interval between wavelength-multiplexed channels is narrow, and when the polarization states of the optical signals of the respective channels are correlated in a transmission line for a long time and interaction continues.

In a polarization-multiplexed signal, the polarization state varies with the optical phase difference between the vertically polarized wave and the horizontally polarized wave. Thus, the relationship between data carried on the vertically polarized wave and data carried on the horizontally polarized wave affects the polarization state of the signal. Many of the data patterns depend on a user signal (client signal), so they are independent between the multiple channels. Thus, the relationship between data carried on the vertically polarized wave and data carried on the horizontally polarized wave is random between the channels, and naturally the polarization state of the signal is also random between the multiple channels.

FIG. 1 is an example illustrating a state in which correlation between the polarization states of three wavelengths $\lambda 1$, $\lambda 2$, and $\lambda 3$ is low, and is an example in which of the vertical polarization (Y-Pol) and horizontal polarization (X-Pol), the polarization states of the three wavelengths are random for each symbol. In this case, the occurrence of the non-linear optical effects occurring between the channels is reduced.

However, in general, there are areas, such as frame overheads, in which data patterns are the same or non-independent between the multiple channels. FIG. 2 is a diagram illustrating an example of an optical transport unit level k(v) (OTUk(v)) frame format. An OTUk frame is composed of an overhead area, a payload area, and a forward error correction (FEC) parity area. A client signal is inserted in the payload area, and redundant bits for error correction are inserted in the FEC parity area. Monitoring information for a transmission line or information for frame synchronization are inserted in the overhead area. The frame format may be an OTUkV in which the proportion of the FEC parity area is non-standard. The overhead (OH) area may include an area having a parameter affecting a transmission line or a specific fixed pattern. However, if the areas in which the data patterns are non-independent include fixed patterns, the polarization states of the signals cannot be randomized between the multiple channels, and the influence of non-linear optical effects occurring between the channels may appear.

The times when the data patterns, such as the frame overheads, are non-independent generally differ between the multiple channels. In particular, because of difference between reference clocks of the multiple channels, the times when they are non-independent are out of synchronization with high probability. However, when frames are repeatedly transmitted, the times when the data patterns, such as the frame overheads, are non-independent can coincide between the multiple channels with low probability. At this time, the polarization states are correlated between the multiple channels, and unacceptable errors may occur at a receiver.

FIG. 3 is an example illustrating a state in which correlation between the polarization states of the three wavelengths λ1, λ2, and λ3 is high, and is an example in which of the vertical polarization (Y-Pol) and horizontal polarization (X-Pol), signals are concentrated only on the Y-Pol in the three wavelengths. In this case, the non-linear optical effects occurring between the channels occur significantly.

To prevent a situation where the polarization states of the optical signals of the respective channels are correlated in a transmission line for a long time, a method of randomizing polarization of a wavelength-multiplexed signal by using an optical component (polarization scrambler) to reduce non-linear optical effects occurring between channels has been proposed (see, for example, Patent Literature 2).

To reduce non-linear optical effects in a channel, a method of switching polarization of a signal alternately between orthogonal polarizations every symbol to reduce the optical power density of the signal in each polarization has been proposed (see, for example, Patent Literature 2). For a signal based on polarization multiplexing, a method of halving a pulse width and switching alternately between orthogonal polarizations every ½ symbol has also been proposed (see, for example, Patent Literature 3).

As a technique for compensating waveform distortion due to non-linear optical effects, a digital back propagation method of reproducing a signal at a transmitting end by simulating backward propagation in a fiber by digital signal processing is known (see, for example, Non Patent Literature 3). An optical phase conjugation method of canceling phase distortion at a receiving end by inverting the phase of light at a middle of a transmission line is also known (see, for example, Non Patent Literature 4).

CITATION LIST

Patent Literature

Patent Literature 1: Japanese Patent Application Publication No. 2001-136125
Patent Literature 2: U.S. Pat. No. 5,841,557
Patent Literature 3: Japanese Patent Application Publication No. 2012-108301
Patent Literature 4: International Publication No. 2012/073590
Patent Literature 5: International Publication No. 2011/096488

Non Patent Literature

Non Patent Literature 1: Optical Internetworking Forum, "100G Ultra Long Haul DWDM Framework Document", June 2009
Non Patent Literature 2: E. Yamazaki and 27 others, "Fast optical channel recovery in field demonstration of 100-Gbit/s Ethernet (trade mark) over OTN using real-time DSP", Optics Express, Jul. 4, 2011, vol. 19, no. 14, pp. 13179-13184
Non Patent Literature 3: X. Li and six others, "Electronic post-compensation of WDM transmission impairments using coherent detection and digital signal processing", Optics Express, vol. 16, no. 2, pp. 880-888, 2008
Non Patent Literature 4: D. D. Marcenac and six others, "40 Gbit/s transmission over 406 km of NDSF using mid-span spectral inversion by four-wave-mixing in a 2 mm long semiconductor optical amplifier", Electronics Letters, vol. 33, no. 10, pp. 879-880, 1997

SUMMARY OF INVENTION

Technical Problem

The above method of Patent Literature 2 is effective for reducing deterioration in transmission quality of an OOK signal, DBPSK signal, and DQPSK signal, for which signal detection is performed by direct detection or (direct) delay detection. However, when it is applied to a polarization multiplexing method that performs signal detection by a digital coherent method, there is a problem in that polarization separation processing at a receiving end is difficult.

The above method of Patent Literature 3, 4, or 5 is effective for reducing the optical power density in the same polarized wave in a channel, but has a problem in that it cannot manage the polarization states of the optical signals of multiple channels and reduce non-linear optical effects occurring due to correlation of the polarization states in a transmission line for a long time.

The above methods of Non Patent Literatures 3 and 4 have problems in that the size of a circuit for implementing the digital signal processing is huge and a device for inverting the phase of light is necessary at a middle of the transmission line.

The present invention has been made to solve such problems, and is intended to provide an optical transmission system and an optical transmission method that reduces the time period during which the polarization states of multiple channels are correlated in a transmission line, thereby reducing non-linear optical effects occurring between the channels and reducing deterioration in signal quality at a receiving end.

Solution to Problem

The present invention is an optical transmission method for wavelength-multiplexing and transmitting a plurality of channels including data, wherein the data are composed of data areas independent between the channels and data areas non-independent between the channels, and wherein data patterns of the data areas non-independent between the channels are variable.

Advantageous Effects of Invention

The present invention can manage the polarization states of optical signals of multiple channels without complicating polarization separation processing at a receiving end in a polarization multiplexing/digital coherent method and reduce an error rate at a receiver to a specific threshold value or less, and can reduce the error rate at the receiver to the specific threshold value or less without using complicated signal processing or an expensive optical device.

BRIEF DESCRIPTION OF DRAWINGS

FIG. 17 is a schematic diagram illustrating an example of data pattern control according to the fourth embodiment of the present invention.

DESCRIPTION OF EMBODIMENTS

Embodiments of an optical transmission device according to the present invention will be described below in detail with reference to the drawings. The following embodiments are exemplary embodiments for embodying the present invention, and the present invention is not intended to be limited thereto.

First Embodiment

Figure 1:
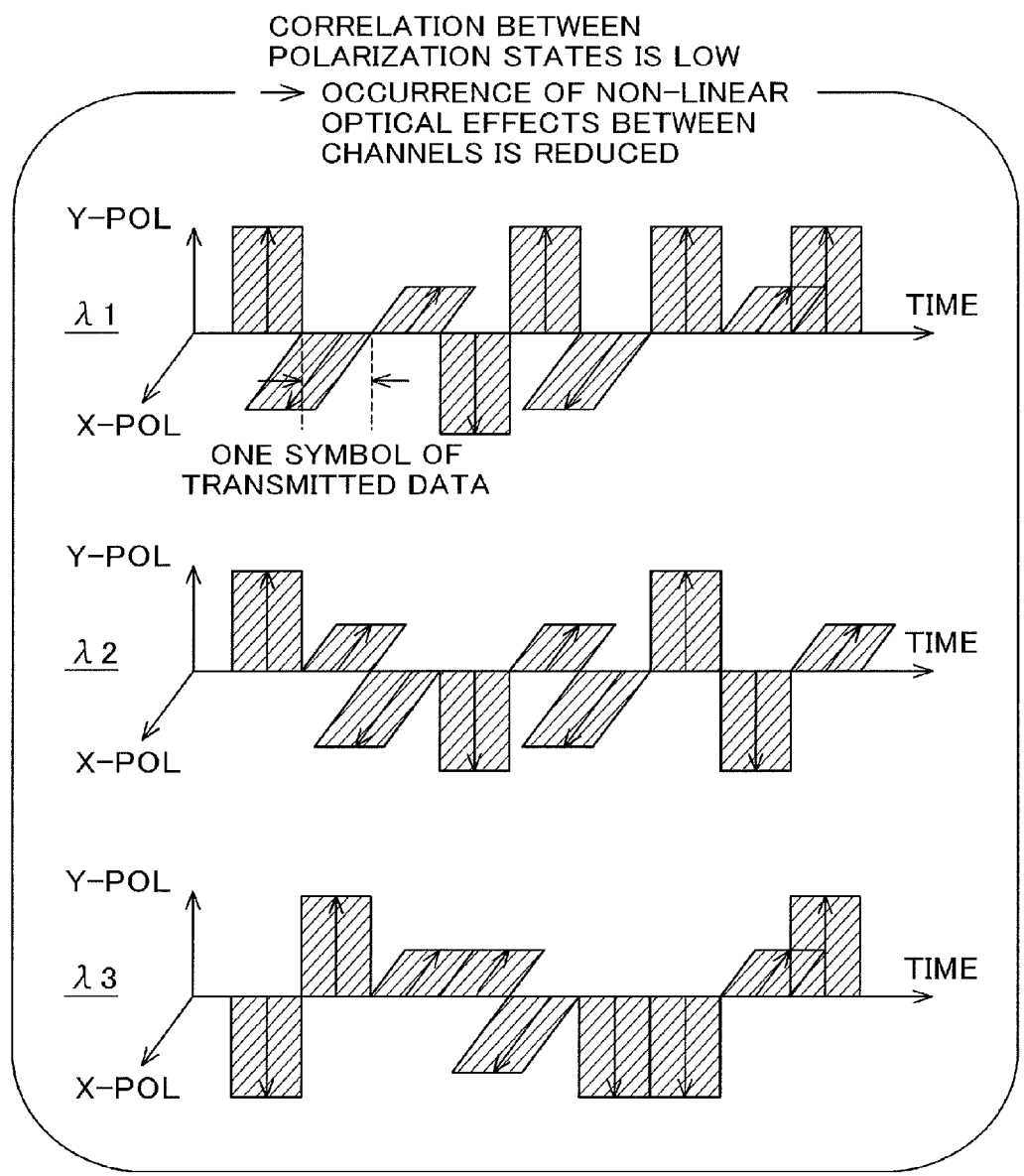
FIG. 1 is a diagram illustrating a situation where polarization states of multiple channels are random.
Figure 2:
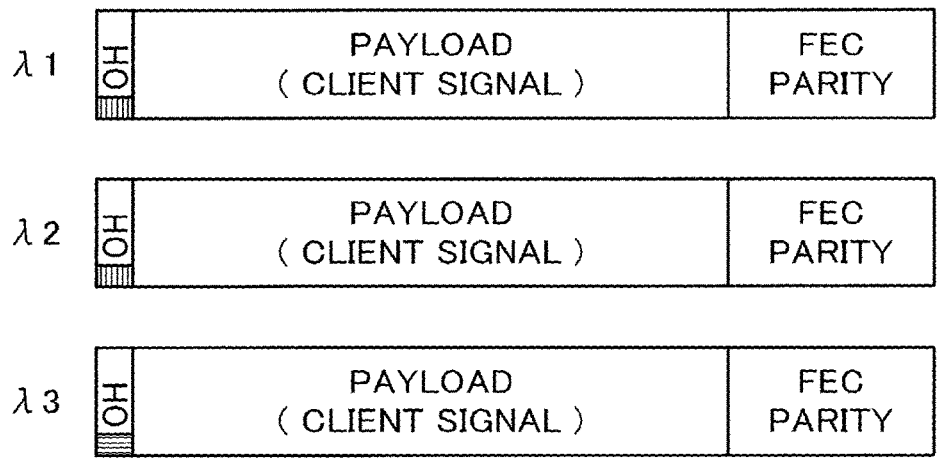
FIG. 2 is a diagram illustrating a frame format.
Figure 3:
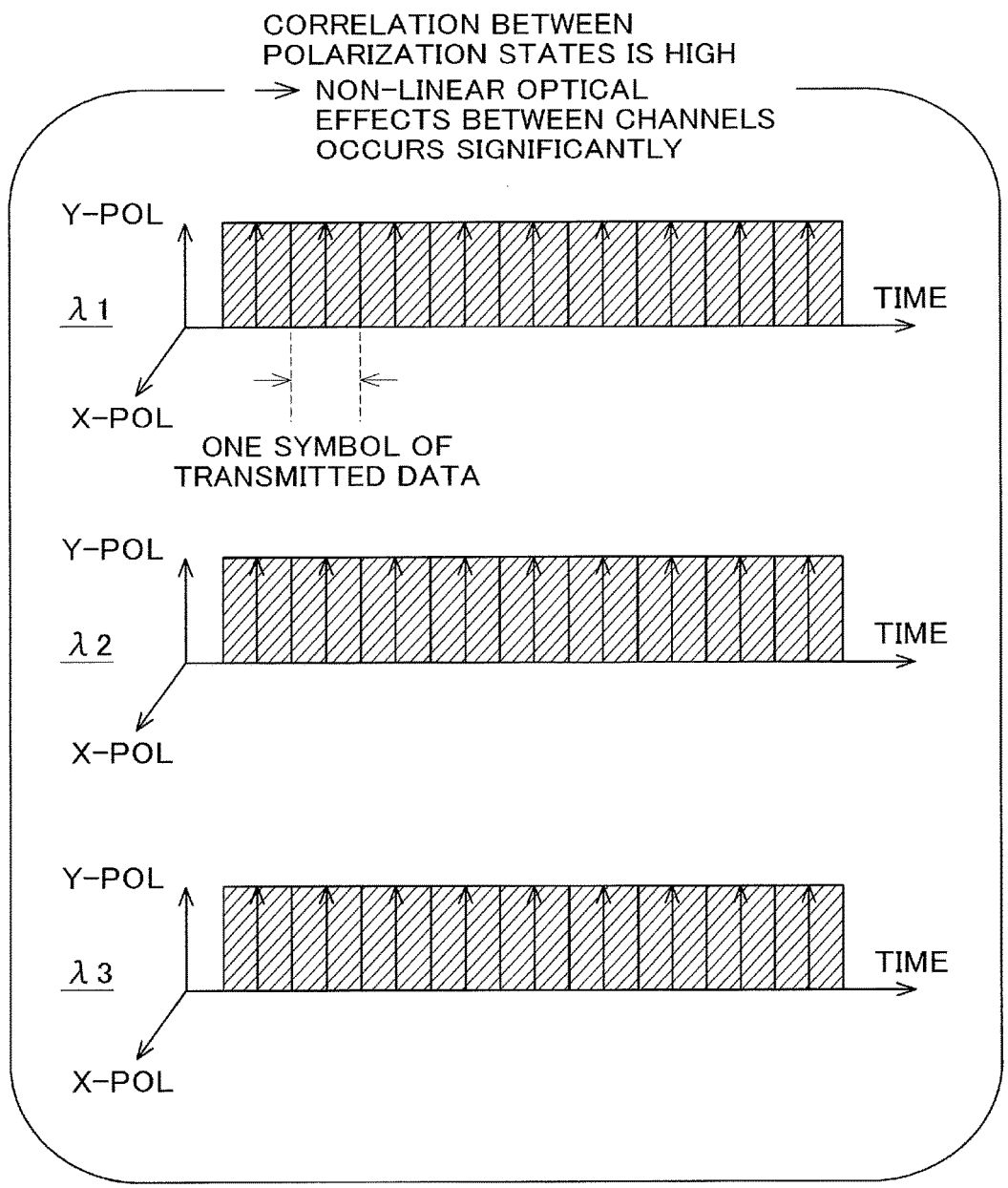
FIG. 3 is a diagram illustrating a situation where correlation of polarization states of multiple channels is high.
Figure 4:
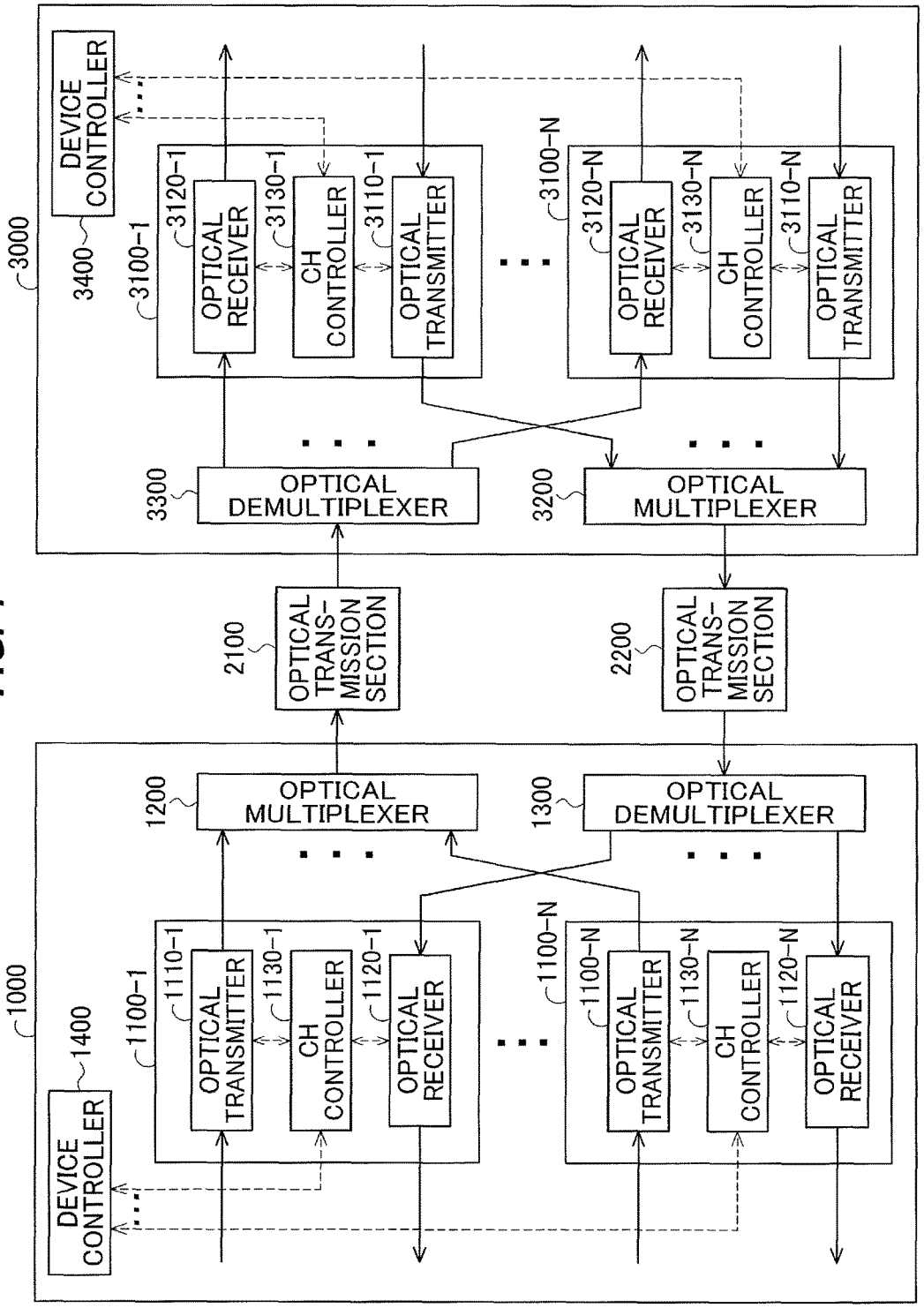
FIG. 4 is a block diagram illustrating an example of a configuration of an optical transmission system according to a first embodiment of the present invention.

FIG. 4 is a diagram illustrating an example of an optical transmission system using an optical transmission method according to a first embodiment of the present invention. As illustrated in FIG. 4, the optical transmission system according to the first embodiment includes an optical transmission device 1000, optical transmission sections 2100 and 2200 including optical fibers, optical repeaters, or the like, and an optical transmission device 3000. The optical transmission device 1000 includes multiple (N) optical transmitting/receiving units 1100-1 to 1100-N, an optical multiplexer 1200, an optical demultiplexer 1300, and a device controller 1400. Here, N denotes the number of multiplexed optical carriers or optical subcarriers.

The optical transmission device 3000 includes multiple (N) optical transmitting/receiving units 3100-1 to 3100-N, an optical multiplexer 3200, an optical demultiplexer 3300, and a device controller 3400.

Figure 5:
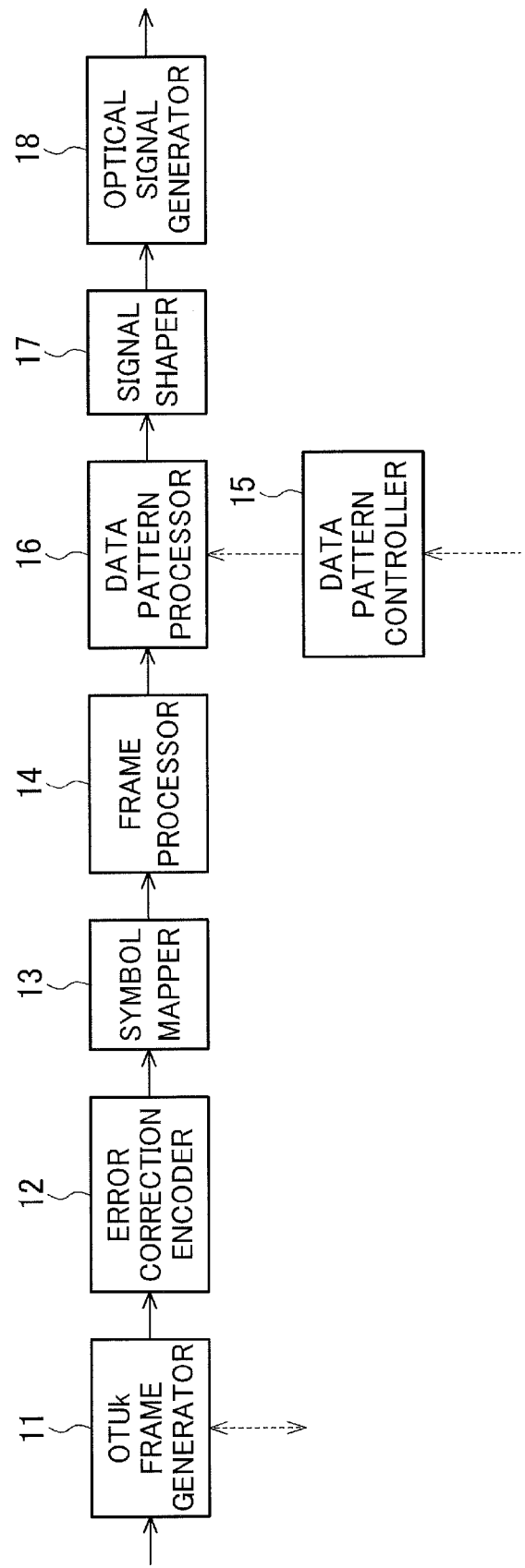
FIG. 5 is a block diagram illustrating an example of a configuration of an optical transmitter according to the first embodiment of the present invention.

The optical transmitting/receiving unit 1100-$i$ includes an optical transmitter 1110-$i$, an optical receiver 1120-$i$, and a channel (ch) controller 1130-$i$. Similarly, the optical transmitting/receiving unit 3100-$i$ ($i$=1 to N) includes an optical transmitter 3110-$i$, an optical receiver 3120-$i$, and a channel (ch) controller 3130-$i$. Here, $i$ denotes an index for an optical carrier or optical subcarrier and is an integer from 1 to N. a FIG. 5 is a diagram illustrating an example of an internal configuration of the optical transmitters 1110-$i$ and 3110-$i$. The optical transmitter 1110-$i$ includes an OTUk frame generator 11, an error correction encoder 12, a symbol mapper 13, a frame processor 14, a data pattern controller 15, a data pattern processor 16, a signal shaper 17, and an optical signal generator 18.

Figure 6:
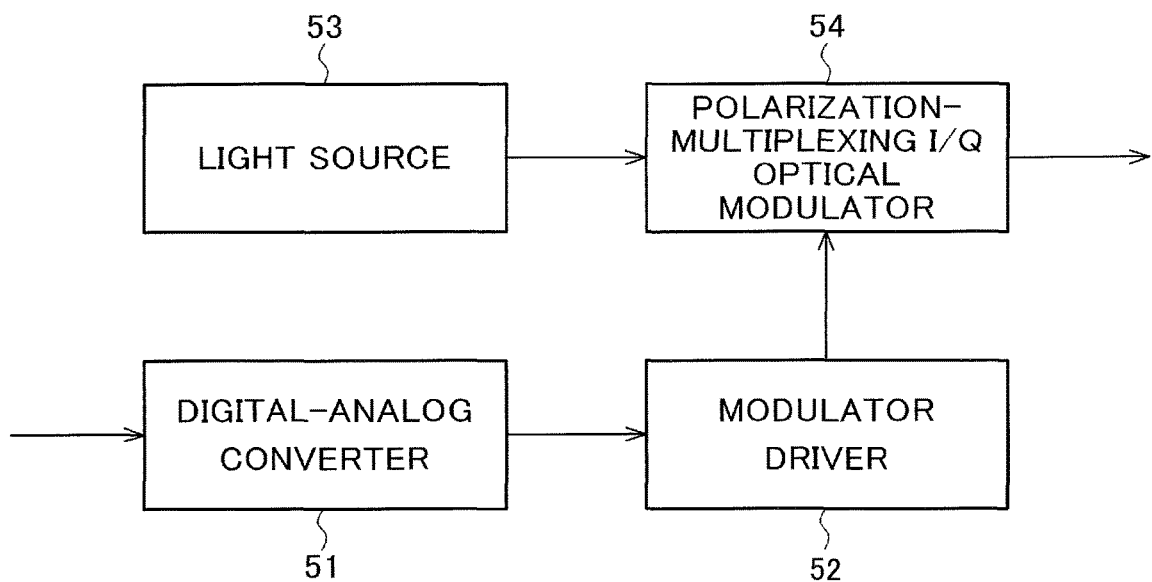
FIG. 6 is a block diagram illustrating an example of a configuration of an optical signal generator in the optical transmitter according to the first embodiment of the present invention.

FIG. 6 is a diagram illustrating an example of an internal configuration of the optical signal generator 18. It includes a digital-analog converter 51, a modulator driver 52, a light source 53, and a polarization-multiplexing I/Q optical modulator 54.

Figure 7:
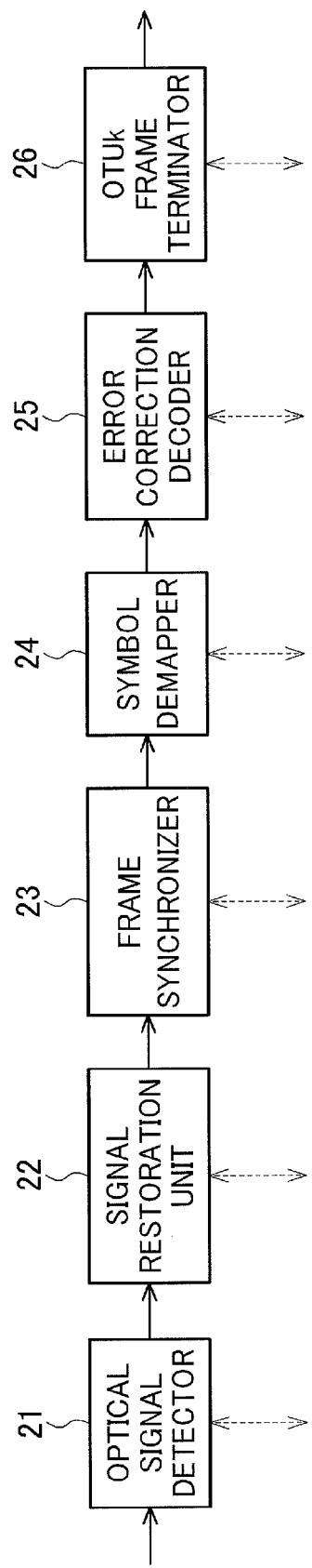
FIG. 7 is a block diagram illustrating an example of a configuration of an optical receiver according to the first embodiment of the present invention.

FIG. 7 is a diagram illustrating an example of an internal configuration of the optical receivers 3120-$i$ and 1120-$i$. They include an optical signal detector 21, a signal restoration unit 22, a frame synchronizer 23, a symbol demapper 24, an error correction decoder 25, and an OTUk frame terminator 26.

Figure 8:
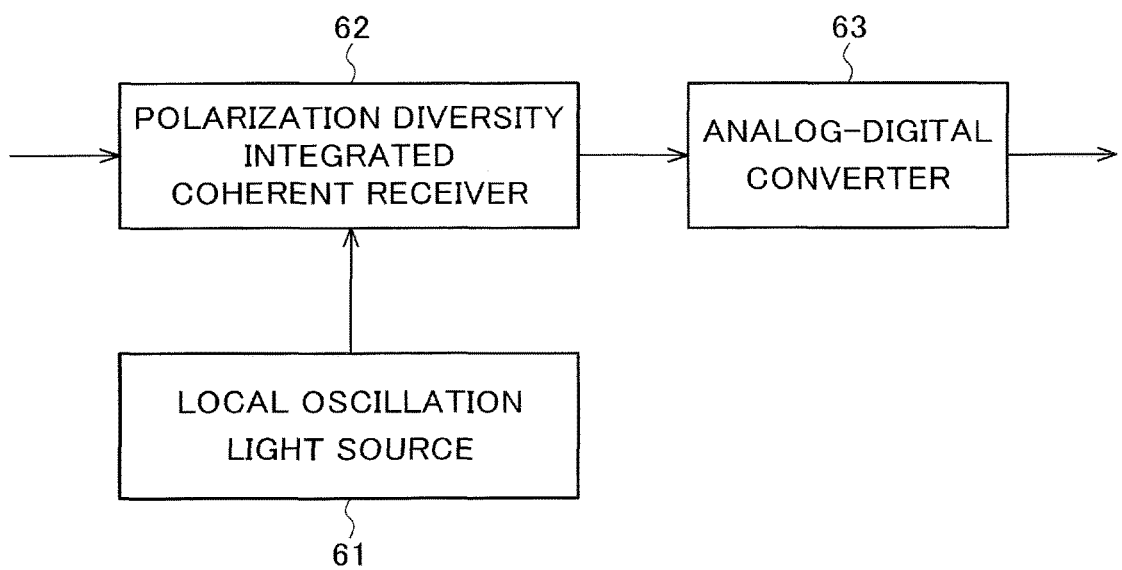
FIG. 8 is a block diagram illustrating an example of a configuration of an optical signal detector in the optical receiver according to the first embodiment of the present invention.
Figure 9:
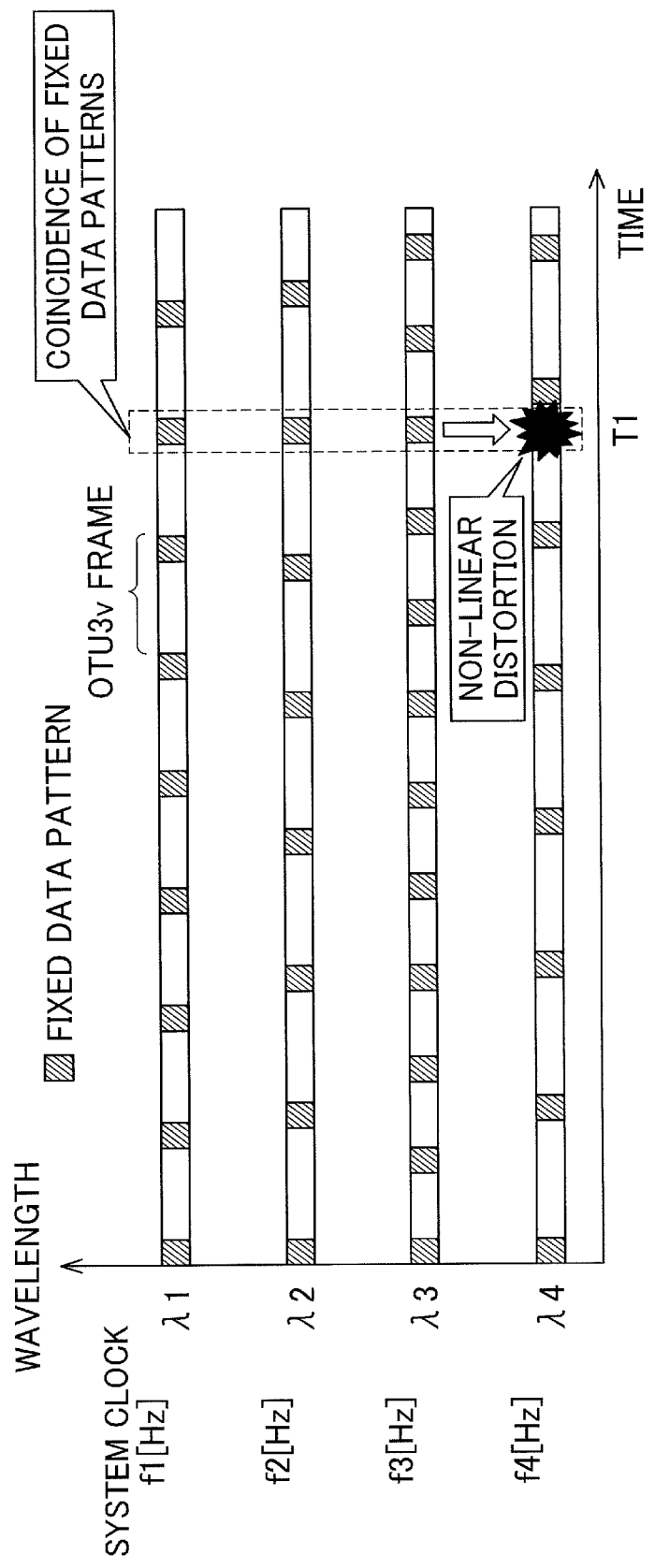
FIG. 9 is a diagram illustrating a situation where the times of data items coincide with each other.

FIG. 8 is a diagram illustrating an example of an internal configuration of the optical signal detector 21. It includes a local oscillation light source 61, a polarization diversity integrated coherent receiver 62, and an analog-digital converter 63.

Hereinafter, the operation of the optical transmission system according to this embodiment will be described.

The following describes operation when an optical signal transmitted from the optical transmission device 1000 is received by the optical transmission device 3000 via the optical transmission section 2100. The same applies to operation when an optical signal transmitted from the optical transmission device 3000 is received by the optical transmission device 1000 via the optical transmission section 2200, so description thereof will be omitted.

In the optical transmitter 1110-$i$, the OTUk frame generator 11 performs optical transport unit level k (OTUk) frame generation on a client signal input from an external unit (not illustrated), and outputs it to the error correction encoder 12. For example, it generates an OTU2 frame of approximately 10 Gbit/s, an OTU3 frame of approximately 40 Gbit/s, or an OTU4 frame of approximately 100 Gbit/s. A frame overhead is added by the frame generation processing.

The frame overhead area includes an area capable of storing arbitrary data corresponding to designation from an external unit (the channel controller 1130-$i$).

The error correction encoder 12 performs error correction encoding on the OTUk frame signal input from the OTUk frame generator 11, and outputs it to the symbol mapper 13.

The symbol mapper 13 performs symbol mapping processing on the error correction encoded signal input from the error correction encoder 12, and outputs it to the frame processor 14. In the symbol mapping, for example, it performs differential quaternary phase-shift keying on a 2-bit input to obtain a 2-bit output. This processing is performed on two types of signals for a vertically polarized wave and a horizontally polarized wave.

The frame processor 14 performs transmission line side frame processing on the signal after the symbol mapping processing input from the symbol mapper 13, and outputs it to the data pattern processor 16. One example of the transmission line side frame processing is multi lane distribution (MLD) processing that cyclically and sequentially uses physical lanes in a transmission line by the frame.

The data pattern controller 15 generates, in accordance with a control signal input from the channel controller 1130-*i*, a data pattern processing rule control signal for determining data pattern processing, and outputs it to the data pattern processor 16.

The data pattern processor 16 performs, based on the data pattern processing rule control signal input from the data pattern controller 15, data pattern processing on a data area, such as a frame overhead, non-independent between the channels in the signal after the transmission line side frame processing input from the frame processor 14, and outputs it to the signal shaper 17.

The signal shaper 17 performs compensation of waveform distortion occurring in the optical signal generator 18, optical multiplexer 1200, optical transmission section 2100, optical demultiplexer 3300, and optical signal detector 21, shaping of the frequency spectrum of the signal, and the like on the signal after the data pattern processing input from the data pattern processor 16, and outputs it to the optical signal generator 18. Digital signal processing known in the art can be used for the signal shaping processing.

The optical signal generator 18 generates an optical signal based on the shaped signal input from the signal shaper 17, and outputs it to the optical multiplexer 1200.

An example of the internal operation of the optical signal generator 18 will be described below. The digital-analog converter 51 digital-analog converts a signal (digital signal) input from an external unit (the signal shaper 17), and outputs it to the modulator driver 52. For example, the digital signal input from the signal shaper 17 is composed of four lanes of a vertical polarization I-axis signal, a vertical polarization Q-axis signal, a horizontal polarization I-axis signal, and a horizontal polarization Q-axis signal; the digital-analog conversion is performed on each of the four lanes, and four-lane analog signals are output to the modulator driver 52.

The modulator driver 52 amplifies the analog signal input from the digital-analog converter 51, and outputs it to the polarization-multiplexing I/Q optical modulator 54. For example, the analog signal input from the digital-analog converter 51 is composed of four lanes of a vertical polarization I-axis signal, a vertical polarization Q-axis signal, a horizontal polarization I-axis signal, and a horizontal polarization Q-axis signal; the amplifying processing is performed on each of the four lanes, and four-lane amplified analog signals are output to the polarization-multiplexing I/Q optical modulator 54.

The light source 53 generates non-modulated light with a wavelength on an ITU-T grid in C-band, for example, and outputs it to the polarization-multiplexing I/Q optical modulator 54.

The polarization-multiplexing I/Q optical modulator 54 modulates the non-modulated light input from the light source 53 by using the amplified digital or analog electrical signal input from the modulator driver 52, and outputs it to an external unit (the optical multiplexer 1200).

The optical multiplexer 1200 multiplexes the respective optical signals input from the optical transmitters 1110-1 to 1110-N, and outputs it to the optical transmission section 2100.

The optical multiplexer is composed of a wavelength selective switch (WSS), an arrayed waveguide grating (AWG), an interleaver, an optical coupler, or the like. It may also include an optical amplifier for loss compensation, an optical fiber for wavelength dispersion compensation, or the like.

The optical transmission section 2100 transmits the optical signal input from the optical multiplexer 1200 in the optical transmission device 1000 and outputs it to the optical demultiplexer 3300 in the optical transmission device 3000. The optical transmission section is composed of an optical fiber, an optical repeater, an optical add-drop multiplexer, or the like.

The optical demultiplexer 3300 demultiplexes the optical signal input from the optical transmission section 2100, and outputs them to the optical receivers 3120-1 to 3120-N in the optical transmitting/receiving units 3100-1 to 3100-N.

Similarly to the optical multiplexer, the optical demultiplexer is composed of a WSS, an AWG, an interleaver, an optical coupler, or the like. It may also include an optical amplifier for loss compensation, an optical fiber for wavelength dispersion compensation, or the like.

In the optical receiver 3120-*i*, the optical signal detector 21 detects an optical signal input from an external unit (the optical demultiplexer 3300), converts it into an electrical digital signal, and outputs it to the signal restoration unit 22. At this time, it can monitor the presence or absence of an optical signal input and an input power and report them to an external unit (the channel controller 3130-*i*).

An example of the internal operation of the optical signal detector 21 will be described below. The local oscillation light source 61 generates non-modulated light with a wavelength on an ITU-T grid in C-band, for example, and outputs it to the polarization diversity integrated coherent receiver 62.

The wavelength of the light output by the local oscillation light source 61 needs to be substantially equal to the wavelength of the carrier or subcarrier of the optical signal input from the external unit (the optical demultiplexer 3300) into the polarization diversity integrated coherent receiver 62.

The polarization diversity integrated coherent receiver 62 performs detection by causing the optical signal input from the external unit (the optical demultiplexer 3300) and the non-modulated light input from the local oscillation light source 61 to be mixed and interfere with each other, converts it into an electrical signal, and outputs it to the analog-digital converter 63.

In the polarization diversity integrated coherent receiver 62, with the local oscillation light as a reference, for each of four lanes of a vertical polarization I-axis component, a vertical polarization Q-axis component, a horizontal polarization I-axis component, and a horizontal polarization Q-axis component, a received signal is detected and converted into an electrical signal, which is amplified to an amplitude required for the processing in the subsequent stage and output.

The analog-digital converter 63 analog-digital converts the electrical signal input from the polarization diversity integrated coherent receiver 62, and outputs it to an external unit (the signal restoration unit 22). The analog-digital conversion is performed for each of the four lanes of the vertical polarization I-axis component, vertical polarization Q-axis component, horizontal polarization I-axis component, and horizontal polarization Q-axis component.

The signal restoration unit 22 performs, on the electrical digital signal input from the optical signal detector 21, compensation of waveform distortion, such as physical delay difference, wavelength dispersion, polarization mode dispersion, polarization state change, or bandwidth narrowing, occurring in the optical signal generator 18, optical multiplexer 1200, optical transmission section 2100, optical demultiplexer 3300, and optical signal detector 21, symbol timing extraction, and compensation for the optical frequency difference and optical phase difference between the carrier or subcarrier and the local oscillation light, thereby restoring the transmitted signal and outputting it to the frame synchronizer 23. At this time, it can output parameters regarding the signal restoration to an external unit (the channel controller **3130-*i***).

Digital signal processing known in the art can be used for the signal restoration processing. The restored signal is composed of, for example, four lanes of the vertical polarization I-axis component, vertical polarization Q-axis component, horizontal polarization I-axis component, and horizontal polarization Q-axis component at the transmitting end. They may be output to the frame synchronizer 23 while having exchange of lanes or logical delay difference between the four lanes.

The frame synchronizer 23 searches the restored signal input from the signal restoration unit 22 for frame overheads to establish synchronization, performs compensation of exchange of lanes or compensation of delay difference between the lanes, and outputs it to the symbol demapper 24. At this time, it can report, to the channel controller **3130-*i***, information regarding a synchronization establishment state, information on the lane exchange, and information on the delay difference between the lanes.

The symbol demapper 24 performs demapping on the frame-synchronized signal input from the frame synchronizer 23, and outputs it to the error correction decoder 25. As the symbol demapping, it performs processing opposite to the processing performed by the symbol mapper 13. When the symbol mapper 13 performs differential quaternary phase-shift keying, the symbol demapper 24 restores 2-bit information based on a phase difference obtained from a signal composed of the I-axis/Q-axis and a signal obtained by delaying the signal by one symbol. It may perform not only hard decision of 0/1 but also soft decision for providing reliability information. At this time, it can report information on the hard-decided or soft-decided symbol to an external unit (the channel controller **3130-*i***). When signals are multiplexed on the vertically polarized wave and horizontally polarized wave, the symbol demapping is performed for each of them.

The error correction decoder 25 performs hard decision or soft decision error correction decoding on the signal after the symbol demapping input from the symbol demapper 24, and outputs it to the OTUk frame terminator 26. At this time, it can monitor bit inversion information, error correction incompletion information, or the like in the error correction decoding and report them to an external unit (the channel controller **3130-*i***).

The OTUk frame terminator 26 performs OTUk frame termination on the error-corrected signal input from the error correction decoder 25, and outputs a client signal to an external unit (not illustrated). At this time, it can monitor an OTUk frame synchronization state and report it to an external unit (the channel controller **3130-*i*). It can also notify an external unit (the channel controller 3130-*i***) of information stored in a frame overhead area.

As described above, each of the optical signal detector 21, signal restoration unit 22, frame synchronizer 23, symbol demapper 24, error correction decoder 25, OTUk frame terminator 26 can communicate with the external unit (the channel controller **3130-*i***) and report the signal communication state thereto.

The channel controller **3130-*i* can manage and update the signal communication state reported from the optical signal receiver 3120-*i*, and report the signal communication state to the device controller 3400, which controls the entire optical transmission device 3000, and the channel controller 1130-*i* in the optical transmission device 1000**.

For example, information regarding the signal communication state may be output by the channel controller **3130-*i* to the optical transmitter 3110-*i*, stored in a frame overhead area by the optical transmitter 3110-*i*, and supplied via the optical multiplexer 3200, optical transmission section 2200, and optical demultiplexer 1300 to the channel controller 1130-*i* in the optical transmitting/receiving unit 1100-*i***.

The storage of the frame overhead information in the optical transmitter **3110-*i* can be performed by, for example, the OTUk frame generator (corresponding to 11** in FIG. 5).

The extraction of the frame overhead information in the optical transmitting/receiving unit **1100-*i* can be performed by, for example, the OTUk frame terminator (corresponding to 26 in FIG. 7) in the optical receiver 1120-*i***.

The device controller 3400 aggregates, manages, and updates the signal communication states of the respective channels i (1 to N) reported from the channel controllers 3130-1 to 3130-N, and can report the signal communication states to the device controller 1400, which controls the entire optical transmission device 1000. For example, the reporting may be performed by means of a monitoring control signal (not illustrated) or through another line (not illustrated).

The device controller 1400 aggregates, manages, and updates the signal communication states of the respective channels i (1 to N) reported from the device controller 3400, and can report the signal communication states to the channel controllers 1130-1 to 1130-N for the respective channels i.

Data pattern processing rules may be assigned to data areas, such as frame overheads, non-independent between the multiple channels as follows, for example. The device controller 1400 determines channel numbers of the respective channels and notifies the data pattern controllers 15 for the respective channels i of the channel numbers of the respective channels via the channel controllers 1130-1 to 1130-N; the data pattern controllers 15 generate data pattern processing rules based on the channel numbers of the respective channels. For example, it is possible to use a pseudo random number generated by a generator polynomial varying depending on whether the channel number is even or odd. It is also possible to change a seed for a pseudo random number or rearrange a single pseudo random number depending on the channel number.

It is also possible to change data pattern processing rules in the optical transmission device 1000 depending on the signal communication states reported from the optical transmission device 3000. For example, depending on the signal communication states, in some cases, such as in optical route change or recovery from optical disruption, it is effective to use data areas, such as frame overheads, non-independent between the channels while leaving the data areas non-independent without performing the data pattern processing. Thus, it is necessary that the data pattern processing rules can be changed depending on the signal communication states.

There may be cases where a single data pattern processing rule is shared between all the channels, including a case where no data pattern processing is performed, cases where multiple data pattern processing rules are shared between all the channels (e.g., two processing rules are used separately in the even channels and odd channels), cases where completely separate data pattern processing rules are provided to all the channels, and other cases.

According to the present invention, it is possible to reduce an error rate determined from a temporal distribution of bit errors obtained from a result of hard decision after demodulation to a threshold value or less. This threshold value can be selected from a level at which error correction is possible, a level at which frame synchronization of error correction codes can be established, a level at which OTN frame synchronization can be established, a level at which an outage probability is less than or equal to a reference defined in recommendation of a standardization organization, such as ITU-T, and other levels. Even when an error rate is particularly high and none of the above levels can be selected, it is possible to reduce the error rate as compared with a case where the present invention is not used, and reduce the error rate to an arbitrary level or less.

In wavelength multiplexing optical transmission, correlation between the polarization states of wavelength-multiplexed multiple channels affects an error rate. By reducing correlation between the polarization states, it becomes possible to randomize waveform distortion due to fiber nonlinear optical effects and reduce the error rate.

The present invention does not limit the modulation method used therein. For example, common modulation methods, such as binary phase-shift keying (BPSK), QPSK, and M-QAM, can be used. It is also possible to mix signals of modulation methods different between channels.

The optical signal detector illustrated in FIG. 8 uses coherent detection; but the scope of the present invention is not limited to coherent detection, and direct detection and delay detection may also be used.

The present invention is expected to be typically used with a symbol rate per channel within a range of 1 to 100 Gsymbol/s. However, the present invention does not limit the symbol rate within the above range. The signals of the multiple channels may have different symbol rates.

FIG. 4 illustrates, as an example, the optical transmission system having a point-to-point configuration, but a reconfigurable optical add drop multiplexing (ROADM) configuration may be employed.

The optical signal may be transmitted together with a signal transmitted from another optical transmitter, not illustrated in FIG. 4, e.g., a 10 Gbit/s intensity modulated signal, an optical signal output from an optical transmitter having no data pattern conversion function, non-modulated light, noise light, or the like in a mixed manner.

As above, in this embodiment, by controlling data patterns of the multiple channels in the optical transmitter to control the polarization states of signals of the multiple channels, it is possible to reduce occurrence of fiber nonlinear optical effects occurring between the channels. Since the data pattern control is performed at a transmitter, the reduction can be achieved without complicating polarization separation processing at a receiving end in a polarization multiplexing/digital coherent method and without using complicated signal processing or an expensive optical device. Thus, it is possible to reduce an error rate in an optical receiver in a wavelength multiplexed optical transmission system to a specific threshold value or less with a simple configuration.

Second Embodiment

Figure 10:
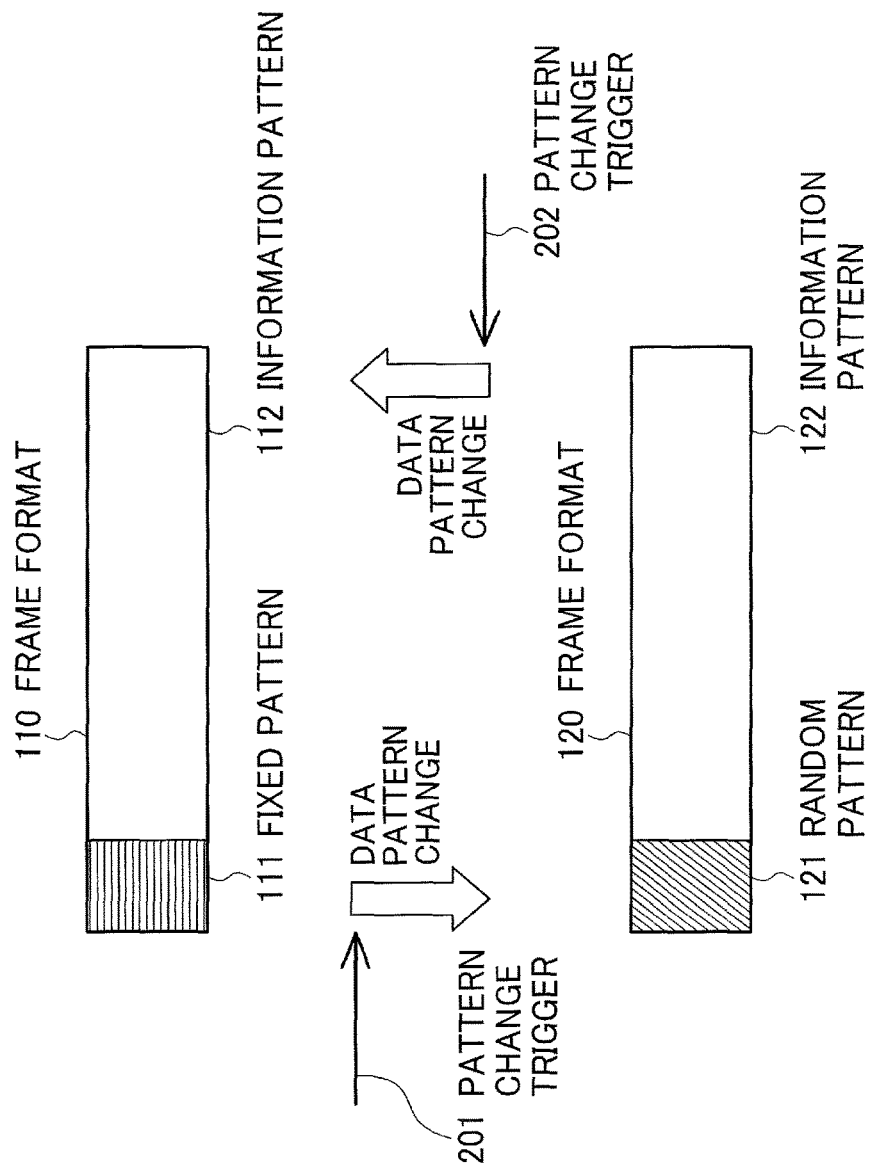
FIG. 10 is a schematic diagram illustrating an example of data pattern control according to a second embodiment of the present invention.

This embodiment specifically illustrates an example of the data pattern control performed by a channel controller 1130 (or channel controller 3130) described in the first embodiment. FIG. 10 is a diagram illustrating an example of data pattern control according to the second embodiment of the present invention. As illustrated in FIG. 10, the data pattern control according to the second embodiment is performed by switching between frame formats 110 and 120 in response to pattern change triggers 201 and 202. The frame format 110 is composed of a predetermined fixed pattern 111 and an information pattern 112. The frame format 120 is composed of a random pattern 121 and an information pattern 122. The channel controller 1130 generates the pattern change triggers 201 and 202 depending on the signal communication states.

Hereinafter, the operation of the data pattern control of this embodiment will be described.

In an initial start state, the signal after transmission line frame processing output from the optical transmitting/receiving unit 1100 described in the first embodiment to the optical multiplexer 1200 has a structure in the frame format 110. The data area, such as the frame overhead, non-independent between the channels is composed of the fixed pattern 111, and the other data area is composed of the information pattern 112. The information pattern 112 includes information bits, error correction parity bits, or the like.

When the pattern change trigger 201 is generated, the signal after transmission line frame processing is switched from the frame format 110 to the frame format 120 by processing of the channel controller 1130. In the frame format 120, the data area, such as the frame overhead, non-independent between the channels is composed of the random pattern 121, and the other data area is composed of the information pattern 122. The information pattern 122 includes information bits, error correction parity bits, or the like.

When the pattern change trigger 202 is generated in the state where the optical transmitting/receiving unit 1100 outputs a signal having a structure in the frame format 120, the signal after transmission line frame processing is switched from the frame format 120 to the frame format 110 by processing of the channel controller 1130. At this time, the data area, such as the frame overhead, non-independent between the channels is composed of the fixed pattern 111, and the other data area is composed of the information pattern 112.

Figure 11:
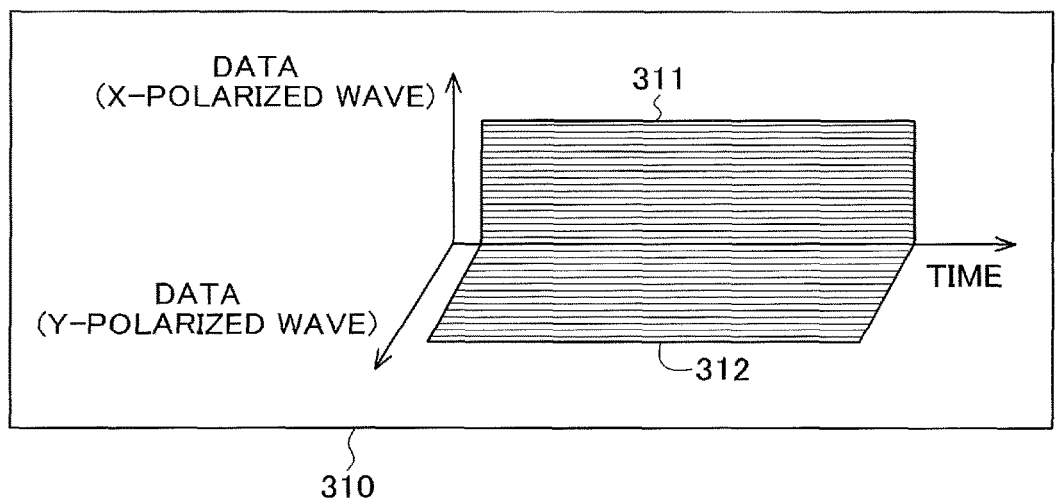
FIG. 11 is a schematic diagram illustrating a concept of a fixed pattern according to the second embodiment and a third embodiment of the present invention.

As the fixed pattern 111, for example, a fixed pattern 310 conceptually illustrated in FIG. 11 is used. The X-polarized wave is assigned an X-polarized wave fixed pattern 311, and the Y-polarized wave is assigned a Y-polarized wave fixed pattern 312. Each of the fixed patterns may be an alternating pattern of 0 and 1, a pseudo random pattern, or the like. The X-polarized wave fixed pattern 311 and Y-polarized wave fixed pattern 312 may be the same pattern, cyclically shifted patterns, or the like.

The use of the fixed pattern 111 configured as above makes it possible to perform estimation of transmission line conditions or other processing. For example, it is possible to estimate a wavelength dispersion, a frequency offset between received signal light and local oscillation light, or the like. On the other hand, the polarization state in the channel or over the multiple channels can be a unique state, or a single state at worst. In this case, if times of data areas, such as frame overheads, non-independent between the channels coincide between the channels, instantaneous deterioration in transmission quality may occur via fiber nonlinear optical effects or the like.

Figure 12:
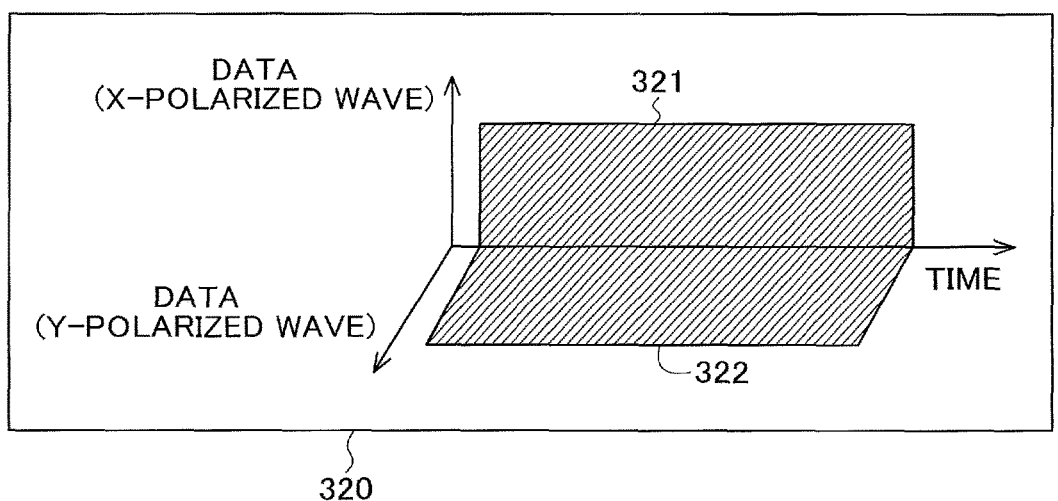
FIG. 12 is a schematic diagram illustrating a concept of a random pattern according to the second embodiment of the present invention.

As the random pattern 121, for example, a random pattern 320 conceptually illustrated in FIG. 12 is used. The X-polarized wave is assigned an X-polarized wave random pattern 321, and the Y-polarized wave is assigned a Y-polarized wave random pattern 322. Each of the random patterns may be, for example, a pseudo random pattern. The X-polarized wave random pattern 321 and Y-polarized wave random pattern 322 may be pseudo random patterns generated by different generator polynomials, may be obtained by dividing a pseudo random pattern generated by a single generator polynomial, may be obtained by cyclically shifting multiple pseudo random sequences, or may be other patterns. For different channels, the amount of the cyclic shift may vary depending on the channel number.

The use of the random pattern 121 configured as above makes it impossible to perform estimation of transmission line conditions or other processing. On the other hand, the polarization state in the channel or over the multiple channels is randomized. In this case, even if times of data areas, such as frame overheads, non-independent between the channels coincide between the channels, the probability of occurrence of instantaneous deterioration in transmission quality via fiber non-linear optical effects or the like is reduced.

As described above, the channel controllers 1130 generate pattern change triggers 201 and 202 depending on the signal communication states described in the first embodiment. For example, if the signal of a channel i of interest is normally communicated at the receiving side, a pattern change trigger 201 for the channel i is generated to switch from the frame format 110 to the frame format 120. After that, if the signal of the channel i of interest is not normally communicated at the receiving side due to change in transmission line conditions or other factors, a pattern change trigger 202 for the channel i is generated.

The pattern change triggers 201 and 202 may be generated alternately at arbitrary time intervals. The pattern change triggers 201 and 202 may be provided at the same time or at different times between the multiple channels. If the signal communication is normally performed, in order to limit the number of channels on which signals in the frame format 110 are output in the wavelength multiplexed signal to a predetermined value or less, the data pattern change triggers 201 and 202 may be alternately generated for channels the number of which is less than or equal to the predetermined value. Further, it is possible to limit the number of channels on which signals in the frame format 110 are output to the predetermined value or less by adjusting times of the generation of data pattern change triggers 201 and 202 while changing the channels on which signals in the frame format 110 are output. This can be achieved by aggregating and managing the pattern change triggers 201 and 202 for the multiple channels as described above. By limiting the number of channels on which signals in the frame format 110 are output to the predetermined value or less, it is possible to reduce the probability of occurrence of instantaneous quality deterioration occurring due to synchronous propagation of fixed patterns in a fiber between the multiple channels, and it is also possible to perform estimation of transmission line conditions at a certain frequency.

Third Embodiment

Figure 13:
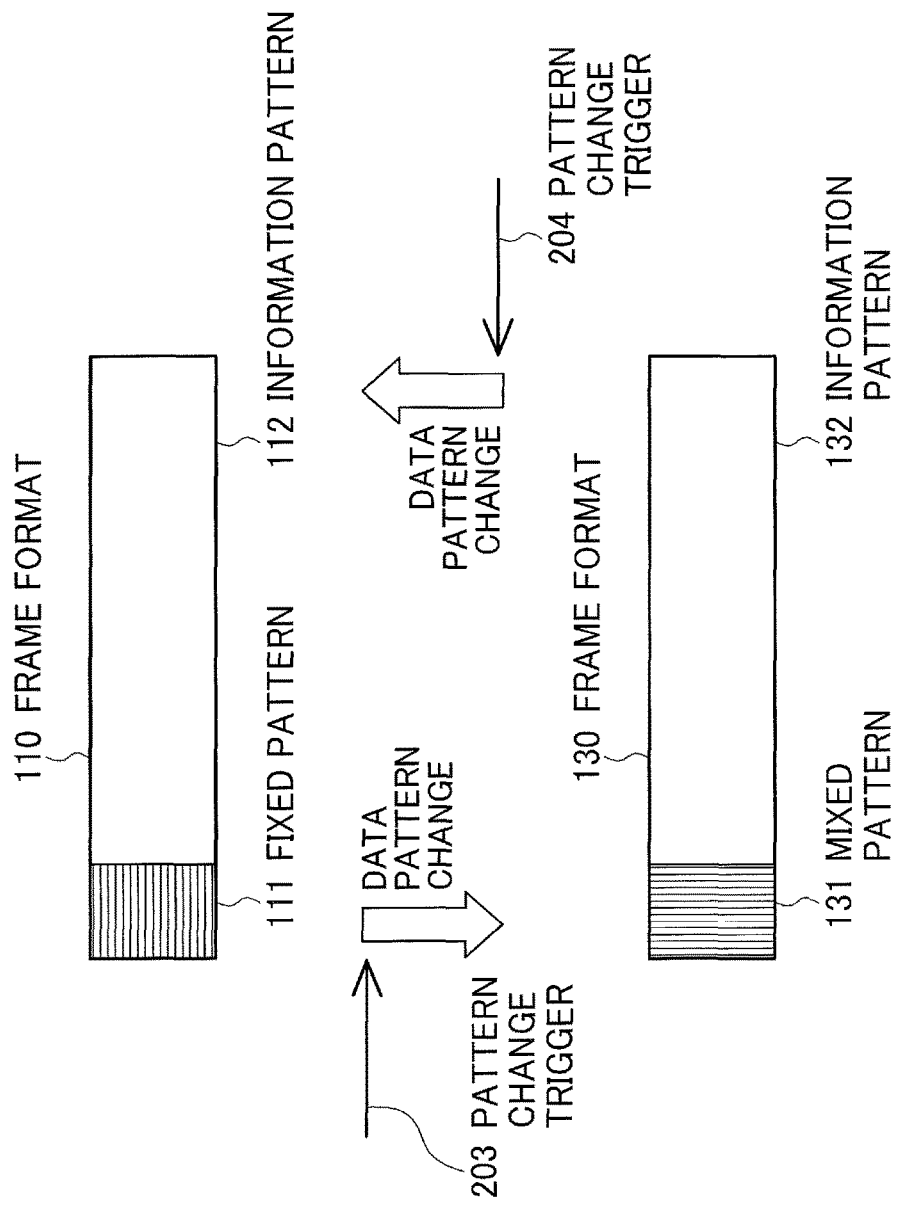
FIG. 13 is a schematic diagram illustrating an example of data pattern control according to the third embodiment of the present invention.

This embodiment specifically illustrates an example of the data pattern control described in the first embodiment. FIG. 13 is a diagram illustrating an example of data pattern control according to the third embodiment of the present invention. As illustrated in FIG. 13, the data pattern control according to the third embodiment switches between frame formats 110 and 130 in response to pattern change triggers 203 and 204. The frame format 110 is the same as that of the second embodiment. The frame format 130 is composed of a mixed pattern 131 and an information pattern 132. A channel controller 1130 generates the pattern change triggers 203 and 204 depending on the signal communication states.

Hereinafter, the operation of the data pattern control of this embodiment will be described.

In an initial start state, the signal after transmission line frame processing output from the optical transmitting/receiving unit 1100 described in the first embodiment to the optical multiplexer 1200 has a structure in the frame format 110. The data area, such as the frame overhead, non-independent between the channels is composed of the fixed pattern 111, and the other data area is composed of the information pattern 112. The information pattern 112 includes information bits, error correction parity bits, or the like.

When the pattern change trigger 203 is generated, the signal after transmission line frame processing is switched from the frame format 110 to the frame format 130 by processing of the channel controller 1130. In the frame format 130, the data area, such as the frame overhead, non-independent between the channels is composed of the mixed pattern 131, and the other data area is composed of the information pattern 132. The information pattern 132 includes information bits, error correction parity bits, or the like.

When the pattern change trigger 204 is generated in the state where the optical transmitting/receiving unit 1100 outputs a signal having a structure in the frame format 130, the signal after transmission line frame processing is switched from the frame format 130 to the frame format 110 by processing of the channel controller 1130. At this time, the data area, such as the frame overhead, non-independent between the channels is composed of the fixed pattern 111, and the other data area is composed of the information pattern 112.

Details of the fixed pattern 111 are as described in the second embodiment.

Figure 14:
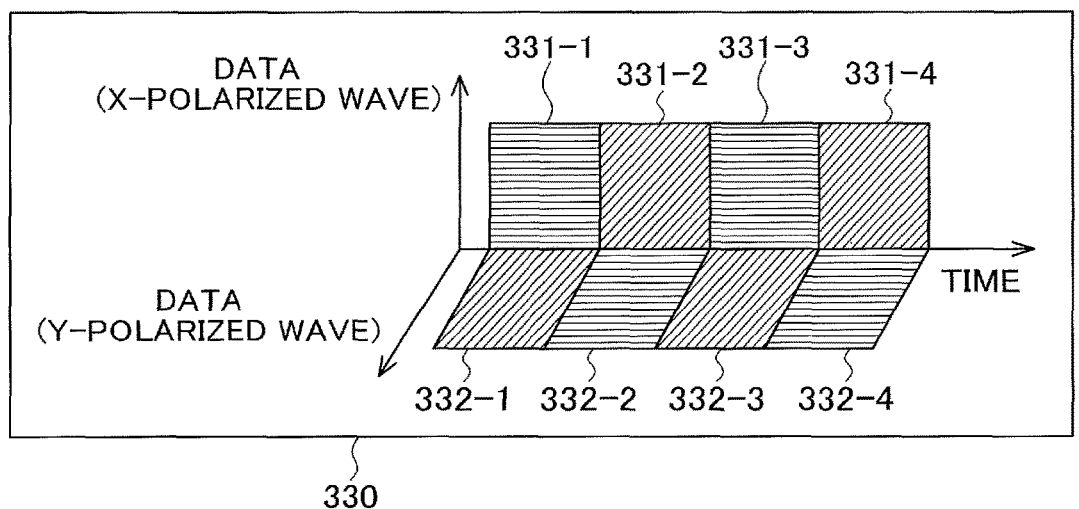
FIG. 14 is a schematic diagram illustrating a concept of a mixed pattern according to the third embodiment and a fourth embodiment of the present invention.

As the mixed pattern 131, for example, a mixed pattern 330 conceptually illustrated in FIG. 14 is used. The X-polarized wave is assigned an X-polarized wave fixed pattern 331-1, an X-polarized wave random pattern 331-2, an X-polarized wave fixed pattern 331-3, and an X-polarized wave random pattern 331-4 in order; the Y-polarized wave is assigned a Y-polarized wave random pattern 332-1, a Y-polarized wave fixed pattern 332-2, a Y-polarized wave random pattern 332-3, and a Y-polarized wave fixed pattern 332-4 in order. The X-polarized wave random patterns 331-2 and 331-4 and the Y-polarized wave random patterns 332-1 and 332-3 may be pseudo random patterns generated by different generator polynomials, may be obtained by dividing a pseudo random pattern generated by a single generator polynomial, may be obtained by cyclically shifting multiple pseudo random sequences, or may be other patterns. For different channels, the amount of the cyclic shift may vary depending on the channel number.

The use of the mixed pattern 131 configured as above makes it possible to partially perform estimation of transmission line conditions or other processing. A wavelength dispersion, a frequency offset, or the like can be estimated, although the range in which the estimation is possible is small or the estimation accuracy is low as compared to the case where the fixed pattern 111 is used. Further, since one of the X-polarized wave and Y-polarized wave is a random pattern, the polarization state in the channel is random.

When random pattern portions have different patterns between channels, the polarization states of the channels are also randomized. In this case, even if times of data areas, such as frame overheads, non-independent between the channels coincide between the channels, the probability of occurrence of instantaneous deterioration in transmission quality via fiber non-linear optical effects or the like is reduced.

In the mixed pattern 330 exemplarily illustrated in FIG. 14, the data pattern is switched by dividing the time period into four time slots. However, the number of time slots is not limited to four and may be an arbitrary finite number.

In FIG. 14, the X-polarized wave fixed patterns 331-1 and 331-3, Y-polarized wave fixed patterns 332-2 and 332-4, X-polarized wave random patterns 331-2 and 331-4, and Y-polarized wave random patterns 332-1 and 332-3 of the mixed pattern 330 are depicted to have the same pattern length, but they need not necessarily have the same pattern length.

The mixed pattern 330 is illustrated so that the X-polarized wave starts with the X-polarized wave fixed pattern 331-1 and ends with the X-polarized wave random pattern 331-4, and the Y-polarized wave starts with the Y-polarized wave random pattern 332-1 and ends with the Y-polarized wave fixed pattern 331-4. However, for example, the X-polarized wave may start with a random pattern and end with a fixed pattern, and the Y-polarized wave may start with a fixed pattern and end with a random pattern.

Figure 15:
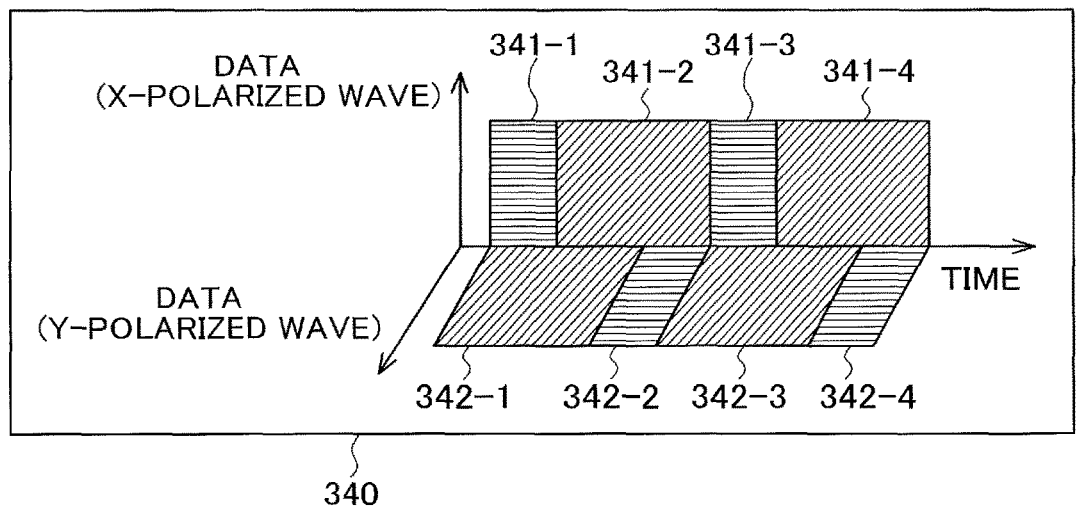
FIG. 15 is a diagram illustrating a concept of the mixed pattern according to the third embodiment and the fourth embodiment of the present invention.

As the mixed pattern 131, for example, a mixed pattern 340 conceptually illustrated in FIG. 15 may be used. The X-polarized wave is assigned an X-polarized wave fixed pattern 341-1, an X-polarized wave random pattern 341-2, an X-polarized wave fixed pattern 341-3, and an X-polarized wave random pattern 341-4 in order; the Y-polarized wave is assigned a Y-polarized wave random pattern 342-1, a Y-polarized wave fixed pattern 342-2, a Y-polarized wave random pattern 342-3, and a Y-polarized wave fixed pattern 342-4 in order. In this example, the lengths of the fixed patterns are shorter than the lengths of the random patterns. By increasing the proportion of the random patterns, even if intersymbol interference occurs due to wavelength dispersion or the like, the polarization state can be kept random in a seamless manner.

Figure 16:
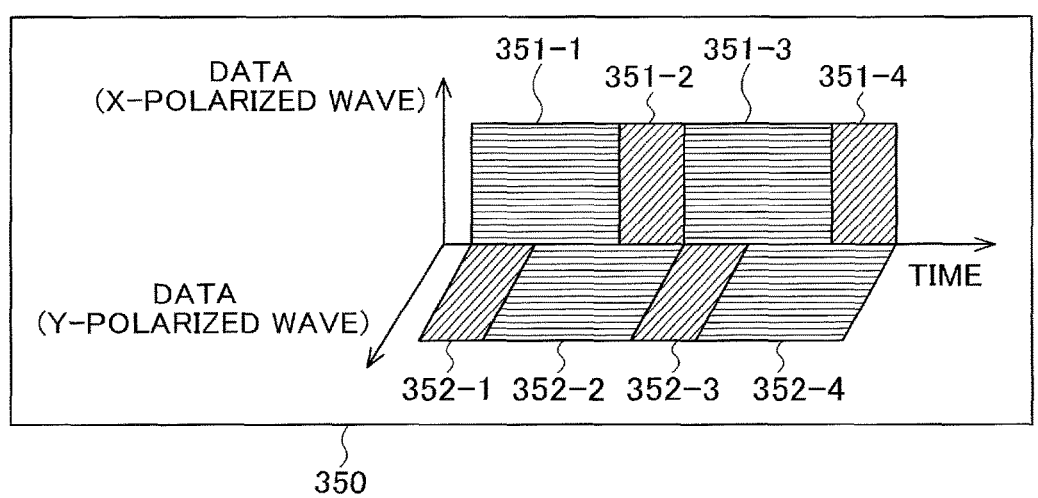
FIG. 16 is a schematic diagram illustrating a concept of the mixed pattern according to the third embodiment and the fourth embodiment of the present invention.

As the mixed pattern 131, for example, a mixed pattern 350 conceptually illustrated in FIG. 16 may be used. The X-polarized wave is assigned an X-polarized wave fixed pattern 351-1, an X-polarized wave random pattern 351-2, an X-polarized wave fixed pattern 351-3, and an X-polarized wave random pattern 351-4 in order; the Y-polarized wave is assigned a Y-polarized wave random pattern 352-1, a Y-polarized wave fixed pattern 352-2, a Y-polarized wave random pattern 352-3, and a Y-polarized wave fixed pattern 352-4 in order. In this example, the lengths of the fixed patterns are longer than the lengths of the random patterns. By increasing the proportion of the fixed patterns, regarding estimation of transmission line conditions or the like, it is possible to reduce the decrease in the range in which the estimation of a wavelength dispersion, a frequency offset, or the like is possible or the decrease in the estimation accuracy.

The pattern change triggers 203 and 204 are generated by the channel controllers 1130 depending on the signal communication states described in the first embodiment, as in the second embodiment.

Fourth Embodiment

This embodiment specifically illustrates an example of the data pattern control described in the first embodiment. FIG. 17 is a diagram illustrating an example of data pattern control according to the fourth embodiment of the present invention. As illustrated in FIG. 17, the data pattern control according to the fourth embodiment switches between frame formats 140 and 150 in response to pattern change triggers 205 and 206. The frame format 140 is composed of a mixed pattern 141 and an information pattern 142. The frame format 150 is composed of a mixed pattern 151 and an information pattern 152.

In an initial start state, the signal after transmission line frame processing output from the optical transmitting/receiving unit 1100 described in the first embodiment to the optical multiplexer 1200 has a structure in the frame format 140. The data area, such as the frame overhead, non-independent between the channels is composed of the mixed pattern 141, and the other data area is composed of the information pattern 142. The information pattern 142 includes information bits, error correction parity bits, or the like.

When the pattern change trigger 205 is generated, the signal after transmission line frame processing is switched from the frame format 140 to the frame format 150 by processing of the channel controller 1130. In the frame format 150, the data area, such as the frame overhead, non-independent between the channels is composed of the mixed pattern 151, and the other data area is composed of the information pattern 152. The information pattern 152 includes information bits, error correction parity bits, or the like.

When the pattern change trigger 206 is generated in the state where the optical transmitting/receiving unit 1100 outputs a signal having a structure in the frame format 150, the signal after transmission line frame processing is switched from the frame format 150 to the frame format 140 by processing of the channel controller 1130. At this time, the data area, such as the frame overhead, non-independent between the channels is composed of the mixed pattern 141, and the other data area is composed of the information pattern 142.

As the mixed pattern 141, for example, the mixed pattern 350 or 330 conceptually illustrated in FIG. 16 or 14 described in the third embodiment may be used. As the mixed pattern 151, for example, the mixed pattern 330 or 340 conceptually illustrated in FIG. 14 or 15 may be used.

The pattern change triggers 205 and 206 are generated by the channel controllers 1130 depending on the signal communication states described in the first embodiment, as in the second embodiment.

INDUSTRIAL APPLICABILITY

As above, the optical transmission method according to the present invention and the optical transmission system for implementing the same can reduce the time period during which the polarization states are correlated between multiple channels in a transmission line to reduce non-linear optical effects occurring between the channels, thereby reducing deterioration in signal quality at a receiving end, so they are useful in long-distance and large-capacity optical transmission.

REFERENCE SIGNS LIST 1000 optical transmission device, 1100-1 to 1100-N optical transmitting/receiving unit, 1110-1 to 1110-N optical transmitter, 1120-1 to 1120-N optical receiver, 1130-1 to 1130-N channel (ch) controller, 1200 optical multiplexer, 1300 optical demultiplexer, 1400 device controller, 2100 optical transmission section, 2200 optical transmission section, 3000 optical transmission device, 3100-1 to 3100-N optical transmitting/receiving unit, 3110-1 to 3110-N optical transmitter, 3120-1 to 3120-N optical receiver, 3130-1 to 3130-N channel (ch) controller, 3200 optical multiplexer, 3300 optical demultiplexer, 3400 device controller, 11 OTUk frame generator, 12 error correction encoder, 13 symbol mapper, 14 frame processor, 15 data pattern controller, 16 data pattern processor, 17 signal shaper, 18 optical signal generator, 51 digital-analog converter, 52 modulator driver, 53 light source, 54 polarization-multiplexing I/Q optical modulator, 21 optical signal detector, 22 signal restoration unit, 23 frame synchronizer, 24 symbol demapper, 25 error correction decoder, 26 OTUk frame terminator, 61 local oscillation light source, 62 polarization diversity integrated coherent receiver, 63 analog-digital converter, 110, 120, 130 frame format, 111 fixed pattern, 112 information pattern, 121 random pattern, 122 information pattern, 201, 202, 203, 204 pattern change trigger, 310 fixed pattern, 311 X-polarized wave fixed pattern, 312 Y-polarized wave fixed pattern, 320 random pattern, 321 X-polarized wave random pattern, 322 Y-polarized wave random pattern, 330 mixed pattern, 331-1, 331-3 X-polarized wave fixed pattern, 331-2, 331-4 X-polarized wave random pattern, 332-2, 332-4 Y-polarized wave fixed pattern, 332-1, 332-3 Y-polarized wave random pattern, 340 mixed pattern, 341-1, 341-3 X-polarized wave fixed pattern, 341-2, 341-4 X-polarized wave random pattern, 342-2, 342-4 Y-polarized wave fixed pattern, 342-1, 342-3 Y-polarized wave random pattern, 350 mixed pattern, 351-1, 351-3 X-polarized wave fixed pattern, 351-2, 351-4 X-polarized wave random pattern, 352-2, 352-4 Y-polarized wave fixed pattern, 352-1, 352-3 Y-polarized wave random pattern.

The invention claimed is:

1. An optical transmission method for wavelength-multiplexing and transmitting a plurality of channels including data, the plurality of channels having polarization states, the data being composed of independent data areas and non-independent data areas, the independent data areas including data having values that are independent between the channels and the non-independent data areas including data having values that are not independent between the channels, the method including:
performing data pattern processing for making data patterns of the non-independent-data areas variable,
setting the polarization states of the plurality of channels,
transmitting an optical signal on an optical transmission section,
receiving the optical signal at an optical receiver, and
setting the data patterns of the non-independent data areas so that in time periods of the non-independent data areas on the optical transmission section, a time period during which polarization states of the plurality of channels are correlated in the optical transmission section has a length such that an error rate is less than or equal to a threshold value, the error rate being determined from a temporal distribution of bit errors obtained from a result of error decision after demodulation in the optical receiver.

2. The optical transmission method of claim 1, wherein in each of the plurality of channels, data are assigned to two or more polarization states.

3. The optical transmission method of claim 1, wherein data pattern processing is performed differently between the plurality of channels to make the data patterns of the non-independent data areas variable.

4. The optical transmission method of claim 1, wherein the data are framed data.

5. The optical transmission method of claim 1, wherein the data are modulated according to polarization multiplexing binary phase-shift keying (BPSK), polarization multiplexing quadrature phase-shift keying (QPSK), or polarization multiplexing m-ary quadrature amplitude modulation.

6. The optical transmission method of claim 1, wherein the data patterns of the non-independent data areas can be changed by switching between a fixed pattern and a random pattern random in each of polarization components and between the polarization components.

7. The optical transmission method of claim 6, wherein the random pattern is a mixed pattern including a fixed pattern as a part of the random pattern.

8. The optical transmission method of claim 7, wherein the mixed pattern is composed of a combination of one or more fixed patterns and one or more random patterns.

9. The optical transmission method of claim 6, wherein the random pattern is generated by performing distribution or cyclic shift of one or more pseudo random patterns generated by one or more generator polynomials, and an amount of the cyclic shift is changed depending on a channel number.

10. The optical transmission method of claim 7, wherein in the mixed pattern, in either one of the polarization components of the channel, a proportion of the random pattern is greater than a proportion of the fixed pattern.

11. The optical transmission method of claim 7, wherein in the mixed pattern, a combination ratio of the fixed pattern and the random pattern is variable.

12. The optical transmission method of claim 8, wherein at least one of the fixed pattern and the random pattern constituting the mixed pattern is composed of two or more types of patterns.

13. The optical transmission method of claim 6, wherein the data patterns of the non-independent data areas are changed depending on a signal communication state.

14. The optical transmission method of claim 6, wherein the data patterns of the non-independent data areas are changed with lapse of time.

15. The optical transmission method of claim 6, wherein a number of channels on which data patterns including the fixed pattern are transmitted is limited to an arbitrary number or less.

16. An optical transmission system capable of wavelength-multiplexing and transmitting a plurality of channels including data, the plurality of channels having polarization states, the data being composed of independent data areas and non-independent data areas, the independent data areas including data having values that are independent between the channels and the non-independent data areas including data having values that are not independent between the channels, the optical transmission system comprising:
a first optical transmission device including a data pattern processor that performs data pattern processing for making data patterns variable on the non-independent data areas, and a polarization multiplexing optical modulator for setting the polarization states;
an optical transmission section including an optical fiber and an optical repeater;
and a second optical transmission device including an optical receiver that receives an optical signal transmitted through the optical transmission section,
wherein the data pattern processor sets the data patterns of the non-independent data areas so that in time periods of the non-independent data areas on the optical transmission section, a time period during which polarization states of the plurality of channels are correlated in the optical transmission section has a length such that an error rate is less than or equal to a threshold value, the error rate being determined from a temporal distribution of bit errors obtained from a result of error decision after demodulation in the optical receiver.

17. The optical transmission system of claim 16, wherein in each of the plurality of channels, the first optical transmission device assigns data to two or more polarization states.

18. The optical transmission system of claim 16, wherein the first optical transmission device switches the data patterns of the non-independent data areas between a fixed pattern and a random pattern random in each of polarization components and between the polarization components, by the data pattern processing.

* * * * *